United States Patent
Onuki

(10) Patent No.: US 8,905,331 B2
(45) Date of Patent: Dec. 9, 2014

(54) WATER SAVING VALVE

(75) Inventor: Makoto Onuki, Kanagawa (JP)

(73) Assignee: Ohshima Kogyo Co., Ltd., Tokyo (JP)

( * ) Notice: Subject to any disclaimer, the term of this patent is extended or adjusted under 35 U.S.C. 154(b) by 483 days.

(21) Appl. No.: 12/922,158

(22) PCT Filed: Oct. 26, 2009

(86) PCT No.: PCT/JP2009/005634
§ 371 (c)(1),
(2), (4) Date: Jun. 21, 2012

(87) PCT Pub. No.: WO2011/051998
PCT Pub. Date: May 5, 2011

(65) Prior Publication Data
US 2012/0248221 A1 Oct. 4, 2012

(51) Int. Cl.
*E03C 1/08* (2006.01)
*B01F 3/04* (2006.01)
*B01F 5/04* (2006.01)
*E03C 1/02* (2006.01)
*E03C 1/084* (2006.01)

(52) U.S. Cl.
CPC ............ *B01F 3/0446* (2013.01); *B01F 5/0413* (2013.01); *B01F 5/043* (2013.01); *E03C 1/02* (2013.01); *E03C 1/084* (2013.01)
USPC ........................................ 239/428.5; 239/569

(58) Field of Classification Search
CPC ...... B05B 1/18; B05B 7/0441; B05B 7/0425; E03C 1/084; E03C 1/0408
USPC ................. 239/428.5, 419.5, 425.5, 344, 569
See application file for complete search history.

(56) References Cited

U.S. PATENT DOCUMENTS

| 5,154,355 | A | * | 10/1992 | Gonzalez | 239/428.5 |
| 7,059,543 | B2 | * | 6/2006 | Dushkin et al. | 239/390 |
| 2010/0116900 | A1 | * | 5/2010 | Wurz | 239/8 |

FOREIGN PATENT DOCUMENTS

| JP | 1991013633 | 6/1989 |
| JP | 1996009253 | 6/1992 |

(Continued)

*Primary Examiner* — Davis Hwu
(74) *Attorney, Agent, or Firm* — Jeffrey S. Melcher; Manelli Selter PLLC

(57) ABSTRACT

A water saving valve is fitted to a hose or a water pipe and mixes air bubbles with water. Water receiving flask part 18 receives tap water from a water pipe 12. Tapered hole part 20 has a flow path whose cross-sectional area is gradually reduced from the upstream side toward the downstream side. Conduit part 32 has a large diameter section 56 and a small diameter section 57. The large diameter section 56 is linked to the tapered hole part 20. The conduit part 32 has a flow path 38 at an axial part thereof whose cross-sectional area is substantially uniform. The large diameter section 56 has an air suction port 30 running through from the flow path 38 of the axial section to the outer peripheral surface. A check valve 64 is inserted into the air suction port 30. Sleeve 50 is rigidly secured to the conduit part 32 by a support body 44 arranged at part of axial hole 90. The sleeve 50 has an eaves-like section 46. The eaves-like section 46 surrounds the outer peripheral surface of the large diameter section 56 with a gap 48 interposed between them. The sleeve 50 surrounds the periphery of the other end of the conduit part 32 with a space interposed between them. Air is sucked in from the gap 48 through the air suction port 30 so that water does not leak if hydraulic pressure is applied in the opposite direction.

10 Claims, 12 Drawing Sheets

(56) References Cited

FOREIGN PATENT DOCUMENTS

| | | |
|---|---|---|
| JP | 1999300234 | 4/1998 |
| JP | 2002102100 | 10/2000 |
| JP | 2005205326 | 1/2004 |
| JP | 2006239106 | 2/2006 |
| JP | 2008237601 | 3/2007 |

* cited by examiner

FIG4
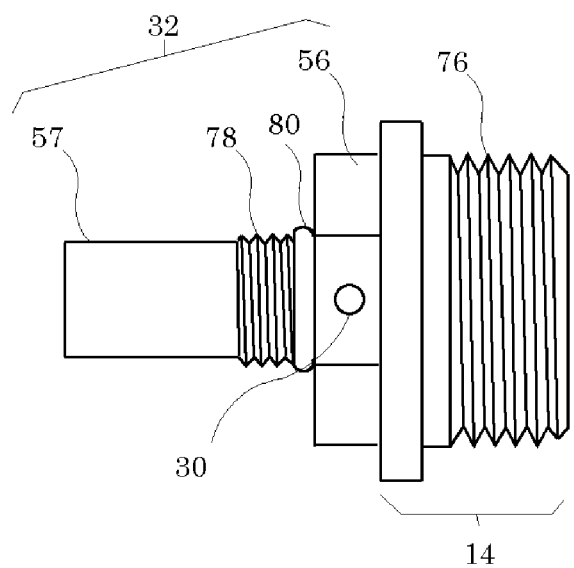
(a)
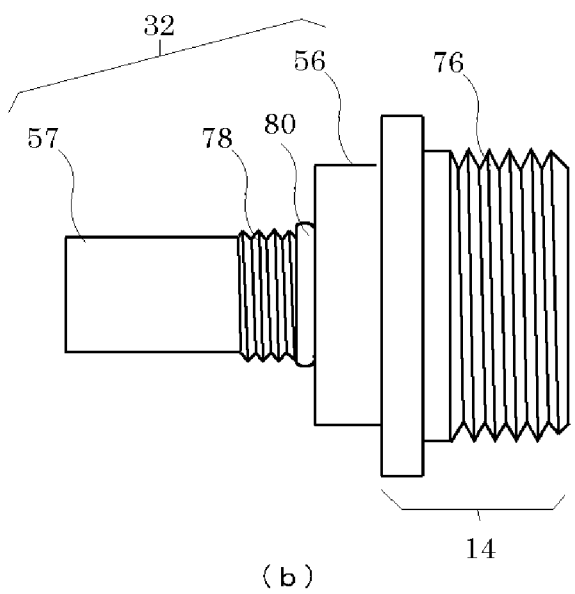
(b)

FIG6
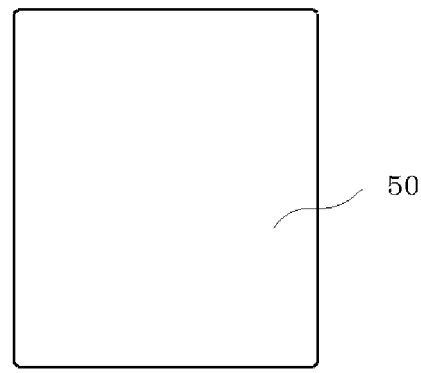
(a)
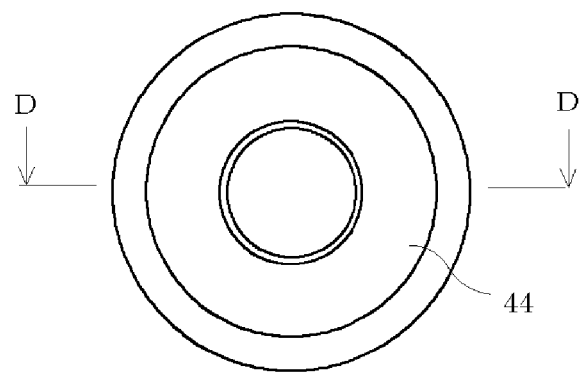
(b)
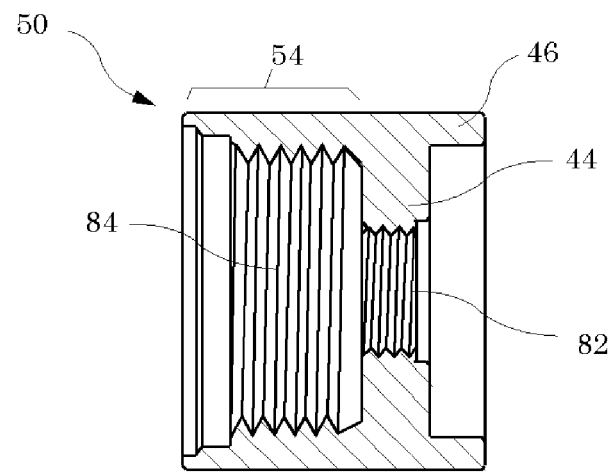
(c)

FIG 7
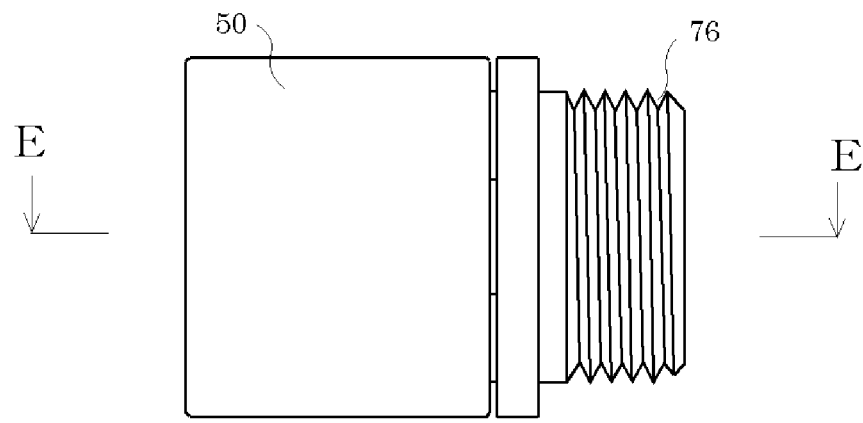
(a)
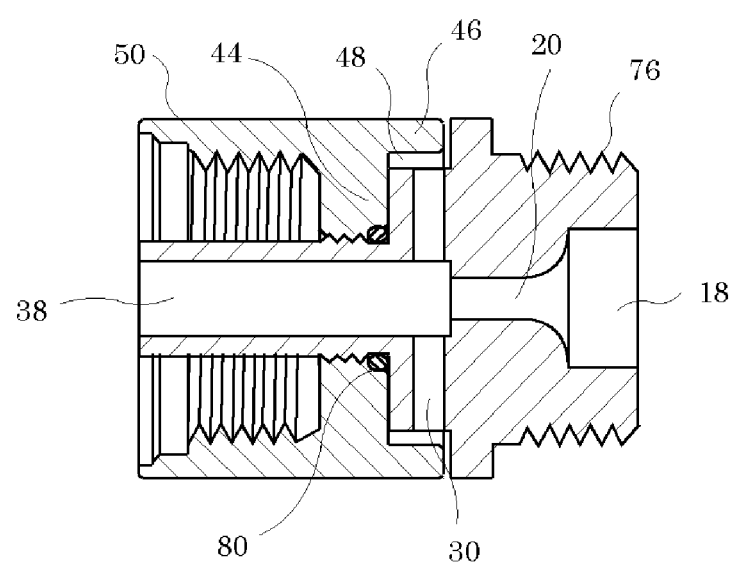
(b)

FIG8
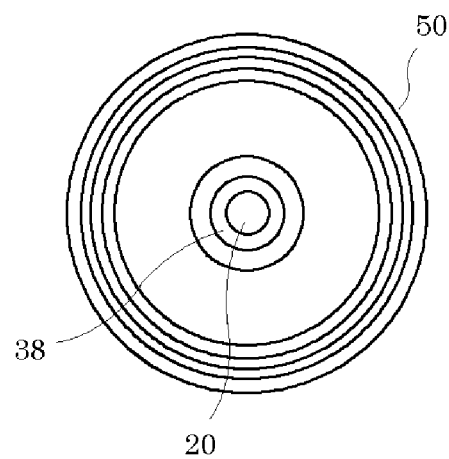
(a)
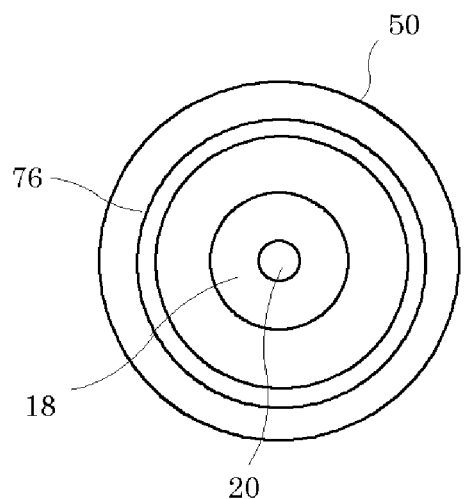
(b)

FIG9
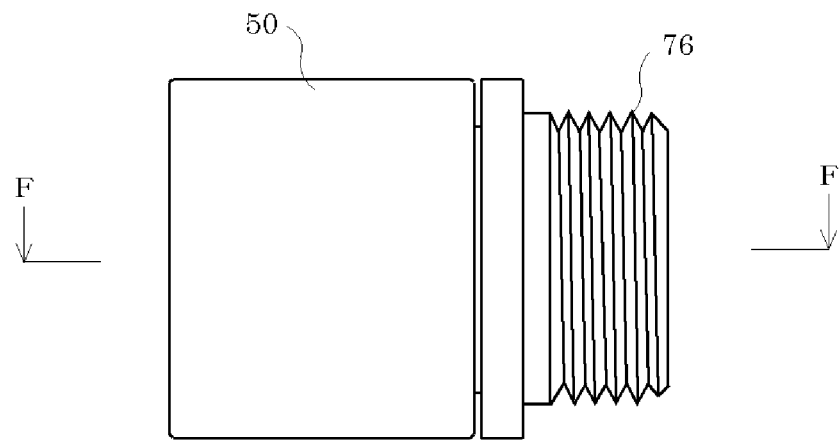
(a)
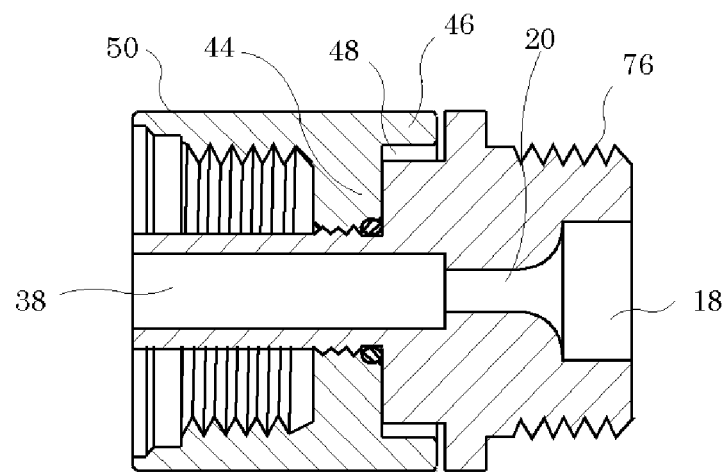
(b)

(a)

(b)

(a)

(b)

FIG14
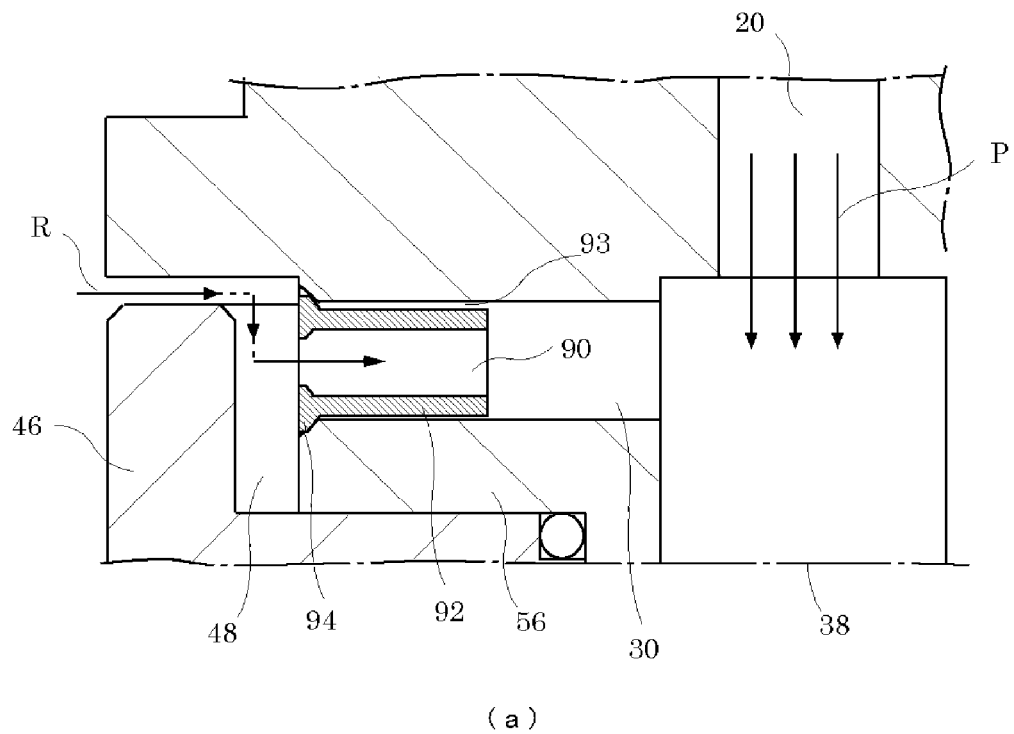
(a)
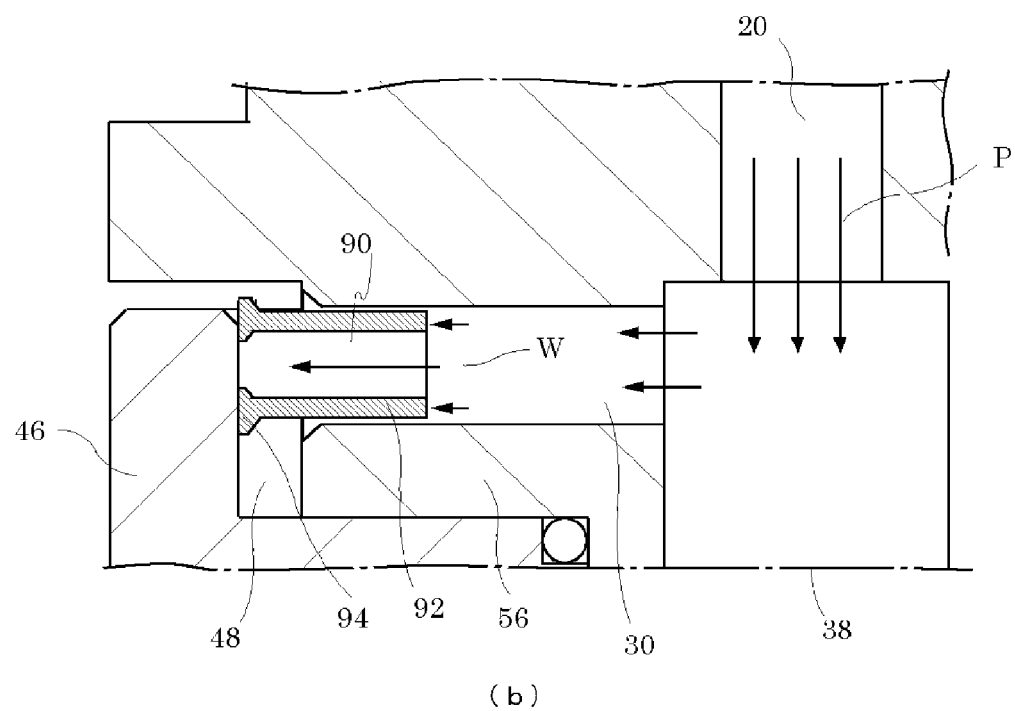
(b)

(a)　　　　　　　(b)

(a)　　　　　　　(c)

(b)　　　　　　　(d)

WATER SAVING VALVE

CROSS-REFERENCE TO RELATED APPLICATIONS

This application is a national stage entry under 35 U.S.C. 371 of International Application No. PCT/JP2009/005634, filed 26 Oct. 2009, designating the United States. The complete contents of this application is incorporated herein by reference.

TECHNICAL FIELD

The present invention relates to a water saving valve having a function of mixing air bubbles into water being supplied through a hose or a water pipe.

BACKGROUND ART

Devices to be fitted to a kitchen unit or a shower head to mix air bubbles to a high ratio into tap water that is being supplied are known (see Patent Literature 1) (see Patent Literature 2). Such a device is employed to prevent water from splashing in a washing work or improve the feeling of the water flow touching the skin when taking a shower.

CITATION LIST

Patent Literature

Patent Literature 1: Jpn. Pat. Appln. Laid-Open Publication No. 2005-205326
Patent Literature 2: Jpn. Pat. Appln. Laid-Open Publication No. 2008-237601

SUMMARY OF INVENTION

Technical Problem

The known prior art has problems to be solved as described below.

If air bubbles in large quantity are mixed into water while water is being supplied to a shower head, it provides not only an effect of improving the shower taker's feeling but also an effect of saving the quantity of consumed water. However, the water saving effect is small when air bubbles are mixed into water only to a low ratio, whereas the shower taker's feeling of water flowing on the skin is no particularly good when air bubbles are mixed into to an excessively high ratio. Thus, a mechanism for mixing air into water to an optimum ratio stably and accurately is required. Additionally, a mechanism is required to be fitted with ease, stout and available at a low price.

The object of the present invention is to provide a water saving valve that meets the following requirements in order to solve the above-identified problems.

(1) It can be fitted to a hose or a water pipe for supplying water.
(2) It is stout.
(3) It can be serviced with ease.

Solution to Problem

The following arrangements provide means for solving the above problems.
<Arrangement 1>

A water saving valve comprising: an upstream side link mechanism part for linking the valve to a water pipe; a water receiving flask part for receiving tap water from the water pipe; a tapered hole part linked at an end thereof to the downstream side of the water receiving flask part with the cross-sectional area of its flow path gradually decreasing toward the other end thereof; a conduit part linked at one end thereof to the other end of the tapered hole part and having a large diameter section of a large outer diameter at the one end side, a small diameter section of a small outer diameter at the other end side and a flow path running along an axial part thereof from the one end to the other end with a uniform cross-sectional area, the large diameter section having an air suction port running through from the axial part to the outer peripheral surface; a sleeve having a support body part rigidly securing part of an axial hole to the conduit part and an eaves-like section surrounding the outer peripheral surface of the large diameter section having the air suction port with a gap for introducing air from the outside; and a downstream side link mechanism part for linking the sleeve to a downstream side piping.
<Arrangement 2>

The water saving valve described under Arrangement 1, wherein the water receiving flask part, the tapered hole part and the conduit part are connected in series so as to show a common axis and each of the water receiving flask part and the conduit part has a substantially uniform circular cross-section all the way from an end to the other end thereof, whereas the water receiving flask part has a greater cross-sectional area at the interface of the water receiving flask part and the tapered hole part and the conduit part has a greater cross-sectional area at the interface of the conduit part and the tapered hole part.
<Arrangement 3>

The water saving valve described under Arrangement 1 or 2, wherein the upstream side link mechanism part, the water receiving flask part, the tapered hole part and the conduit part are integrally formed while the sleeve and the downstream side link mechanism part are integrally formed and the sleeve is rigidly secured to the conduit part by means of a male screw formed on the outer peripheral surface of the large diameter section or the small diameter section of the conduit part and a female screw formed at part of the axial hole of the sleeve.
<Arrangement 4>

The water saving valve described under Arrangement 1 or 2, wherein the upstream side link mechanism part, the water receiving flask part and the conduit part are integrally formed while the sleeve and the downstream side link mechanism part are integrally formed, the tapered hole part is structurally separated so as to be removably fitted into the water receiving flask part, the water receiving flask part and the conduit part are linked to each other by way of a through hole having a cross-sectional area smaller than the conduit part, and the sleeve is rigidly secured to the conduit part by means of a male screw formed on the outer peripheral surface of the large diameter section or the small diameter section of the conduit part and a female screw formed at part of the axial hole of the sleeve.
<Arrangement 5>

The water saving valve described under any of Arrangements 1 through 4, wherein the cross-sectional area of the flow path of the conduit part is made to be greater than the sum of the cross-sectional area of the flow path of the other end of the tapered hole part and the cross-sectional area of the air suction port.

<Arrangement 6>

The water saving valve described under any of Arrangements 1 through 5, wherein a check valve that allows air to be sucked from the air suction port toward the conduit but prevents tap water from flowing out from the conduit part toward the air suction port is contained in the inside of the air suction port.

<Arrangement 7>

The water saving valve described under Arrangement 6, wherein the check valve has a cylindrical section that can freely move in the inside of the air suction port, the area of the gap formed between itself and the inner wall of the air suction port being sufficiently small if compared with the area of the axial hole, and a bulged section arranged at the outer periphery of an end section of the cylindrical section and located between the eaves of the sleeve and the outer surface of the conduit part to limit any move of the cylindrical section from the air suction port to the conduit part, and the check valve releases the axial hole end of the cylindrical section between the eaves of the sleeve and the outer surface of the conduit part to press the axial hole end of the cylindrical section against the eaves and prevent tap water from flowing out from the air suction port through the axial hole of the cylindrical section under the pressure of tap water flowing out from the conduit part toward the air suction port when air is sucked in from the air suction port toward the conduit.

<Arrangement 8>

The water saving valve described under any of Arrangements 1 through 7, wherein the water receiving flask part contains a filter for trapping any foreign object(s) getting into tap water.

<Arrangement 9>

The water saving valve described under any of Arrangements 1 through 8, wherein a flow rectifying cylinder having a large number of through holes extending in parallel with the direction of water flow is provided at the downstream side of the conduit.

<Arrangement 10>

The water saving valve described under any of Arrangements 1 through 9, wherein either the upstream side link mechanism part is made to be a male screw structure and the downstream side link mechanism part is made to be a female structure or the upstream side link mechanism part is made to be a female screw structure and the downstream side link mechanism part is made to be a male screw structure.

Advantageous Effects of Invention

<Effect(s) of Arrangement 1>

The water saving valve of Arrangement 1 can be fitted at an intermediary part of a tap water piping to mix air with tap water. It can mix the tap water received from the water receiving flask part through the tapered hole and the air sucked in from the air suction port in the conduit part to establish an optimum ratio for the mixture of the tap water and air.

<Effect(s) of Arrangement 2>

A size of the hole is selected to make it possible to automatically and easily manufacture a water saving valve having a complex internal structure by a cutting operation and the hole structure is optimized.

<Effect(s) of Arrangement 3>

The eaves-like section surrounding the large diameter section can be formed in a simple manner when the entire water saving valve is made to have a two-piece structure.

<Effect(s) of Arrangement 4>

Since the tapered hole part is removably fitted into the water receiving flask part, the tapered hole part can be replaced according to the application thereof to adjust the water flow rate.

<Effect(s) of Arrangement 5>

Water can be accelerated by the tapered hole part and ejected to splash out strongly from the conduit part to the downstream side by selecting a sufficiently large cross-sectional area for the flow path of the conduit part.

<Effect(s) of Arrangement 6>

If the exit of water is blocked at the downstream side to stop the flow of tap water, the hydraulic pressure in the inside of the conduit part rises so that the tap water flows out from the conduit part toward the air suction port. A shower head or a tap having a water blocking function at the downstream side can be fitted by providing a check valve.

<Effect(s) of Arrangement 7>

As air is sucked in from the air suction port toward the conduit, air enters from the axial hole of the cylindrical section. As tap water tends to flow out from the conduit part toward the air suction port, the axial hole end of the cylindrical section is blocked by the eaves to make it possible to prevent the tap water from flowing out.

<Effect(s) of Arrangement 8>

A filter is provided to prevent any foreign object(s) getting into the tap water from flowing to the downstream side of the water saving valve. As a result, the water saving valve itself is made to be provided with a filtering function and can be serviced with ease.

<Effect(s) of Arrangement 9>

A complex turbulent flow is formed at the part where tap water is discharged from the conduit to the downstream side showing a large cross-sectional area. The turbulent flow gives off noises and vibrations. Therefore, a flow rectifying cylinder is provided to rectify the direction of the water flow.

<Effect(s) of Arrangement 10>

As the upstream side and the downstream side are formed as screw structures, the water saving valve can be inserted into a connecting section of a standard water pipe with ease.

BRIEF DESCRIPTION OF DRAWINGS

FIG. 4(*a*) is a lateral view of the upstream side piece of a water saving valve formed as two-piece structure and FIG. 4(*b*) is a lateral view as viewed in the direction of A.

FIG. 6(*a*) is a lateral view of the sleeve, FIG. 6(*b*) is an end view and FIG. 6(*c*) is a longitudinal cross-sectional view.

FIG. 7(*a*) is a lateral view of the water saving valve of Example 1 and FIG. 7(*b*) is a cross-sectional view thereof taken along line E-E.

FIG. 8(*a*) is a downstream side end view of the water saving valve of Example 1 and FIG. 8(*b*) is an upstream side end view of the water saving valve.

FIG. 9(*a*) is a lateral view of the water saving valve of Example 1 as viewed from another direction and FIG. 9(*b*) is a longitudinal cross-sectional view taken along line F-F.

FIGS. 10(a) through 10(f) illustrate a water saving valve of Example 2, of which FIG. 10(a) is a perspective view of tapered hole unit 86 thereof and FIGS. 10(b) through 10(d) are longitudinal cross-sectional views of different variations of tapered hole unit, while FIG. 10(e) is a longitudinal cross-sectional view showing how a tapered hole unit 86 is fitted to the water saving valve of Example 1 and FIG. 10(f) is a longitudinal cross-sectional view showing how a tapered hole unit is fitted to a water saving valve obtained by modifying part of the water saving valve of Example 1.

FIG. 11(a) is a longitudinal cross-sectional view of the check valve and FIG. 11(b) is an exploded perspective view of the check valve.

FIG. 12(a) is a longitudinal cross-sectional view of the filter and FIG. 12(b) is a perspective view of the filter.

FIGS. 14(a) and 14(b) are longitudinal cross-sectional views of a principal part of a water saving valve of Example 6 that includes a check valve and illustrate its operation.

BEST MODE FOR CARRYING OUT THE INVENTION

Now, the present invention will be described by way of examples.

Example 1

Figure 1:
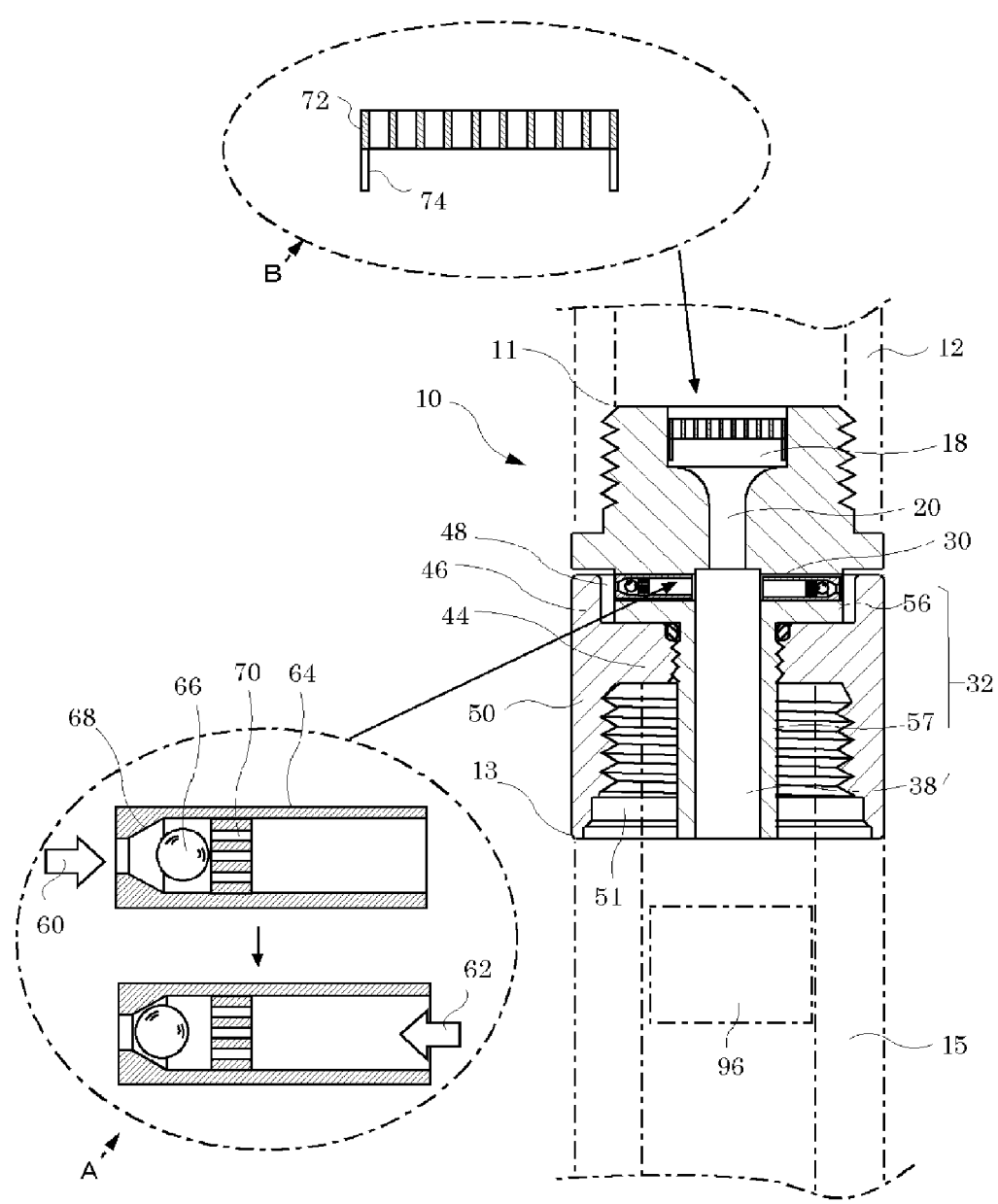
FIG. 1 is a longitudinal cross-sectional view of a water saving valve of Example 1.

FIG. 1 is a longitudinal cross-sectional view of a water saving valve of Example 1.

The water saving valve 10 is fitted in position by being inserted to a midway position of a hose or a water pipe. The illustrated water saving valve 10 is linked to a water pipe 12 at the upstream end 11 thereof and to a piping 15 at the downstream end 13 thereof. The piping 15 may be a shower hose or a tap piping of a water supply system. For example, a shower head 16 is linked to the downstream side of the piping 15. Alternatively, a tap 17 of a water supply system in a kitchen may be linked to the downstream side of the piping 15. The water saving valve 10 mixes air bubbles with tap water by means of the structure shown in FIG. 1 in cross section. At the same time, the water saving valve 10 raises the flow rate to increase the impact of water hitting the hands and/or the body skin of the user. With this arrangement, the feeling of taking a shower is not affected if the quantity of water is reduced. As a result, the charge for tap water can be reduced.

Referring to FIG. 1, tap water passes an axial section of the water saving valve 10. A water receiving flask part 18, a tapered hole part 20 and a conduit part 32 are arranged sequentially from the upstream side in the water saving valve 10. The water receiving flask part 18 receives tap water from the water pipe 12. The tapered hole part 20 is structured in such a way that the cross section of its flow path is gradually reduced from the upstream side toward the downstream side. The conduit part 32 has a large diameter section 56 and a small diameter section 57. The large diameter section 56 is linked to the tapered hole part 20.

The conduit part 32 has a flow path 38 having a substantially uniform cross-sectional area at an axial section thereof. The large diameter section 56 has an air suction port 30 that runs through from the flow path 38 at the axial section to the outer peripheral surface. A check valve 64 is inserted into the air suction port 30. Sleeve 50 is rigidly secured to the conduit part 32 by a support body 44 arranged at part of the axial hole. The sleeve 50 is provided with an eaves-like section 46. The eaves-like section 46 surrounds the outer peripheral surface of the large diameter section 56 with a gap 48 interposed between them. The sleeve 50 surrounds the other end and its vicinity of the conduit part 32 and with a space interposed between them.

Circle A of chain line in FIG. 1 is a longitudinal cross-sectional view of the check valve, showing its operation. CircleB of chain line in FIG. 1 is a longitudinal cross-sectional view of the filter of the water receiving flask part 18. Now, the configuration of the water saving valve 10 according to the present invention will be described in detail by referring to FIG. 2 and the succeeding related drawings.

Figure 2:
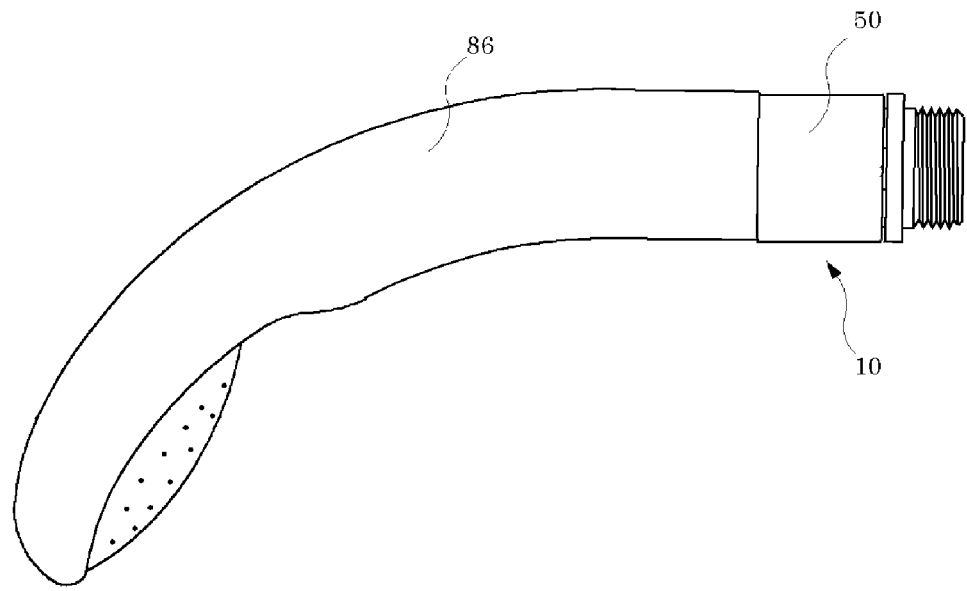
FIG. 2 is a lateral view of the water saving valve fitted to a shower head.
Figure 3:
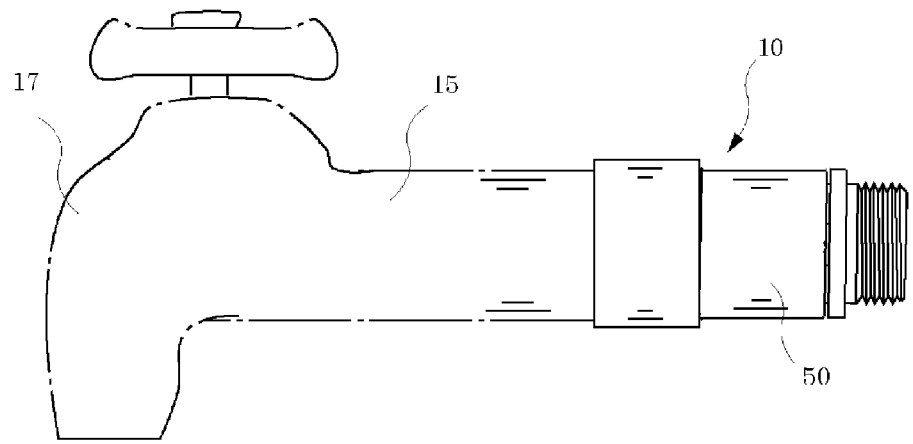
FIG. 3 is a lateral view of the water saving valve fitted to a tap piping of a water supply system.

FIG. 2 is a lateral view showing how the water saving valve 10 is fitted into a shower head 86. FIG. 3 is a lateral view showing how the water saving valve 10 is fitted into the piping 15 of the tap 17 of a water supply system.

As shown in FIG. 2, the sleeve 50 of the water saving valve 10 can be linked to the shower head 86 by screwing the sleeve into the shower head 86. A screw conforming to a relevant standard is employed. More specifically, a female screw section conforming to the standard is formed at an end of the water saving valve 10 and a male screw section conforming the standard is formed at the other end. With this arrangement, the water saving valve 10 can be inserted into a piping or the like whose component pipes are linked by male screws and female screws conforming to the standard. The arrangement of the screws will be described by referring to FIG. 4(a) and the succeeding related drawings. The water saving valve 10 can be made to have dimensions including a diameter of 2 cm and a total length of about 3 to 4 cm. These dimensions can be adjusted according to the dimensions of the piping.

Figure 5:
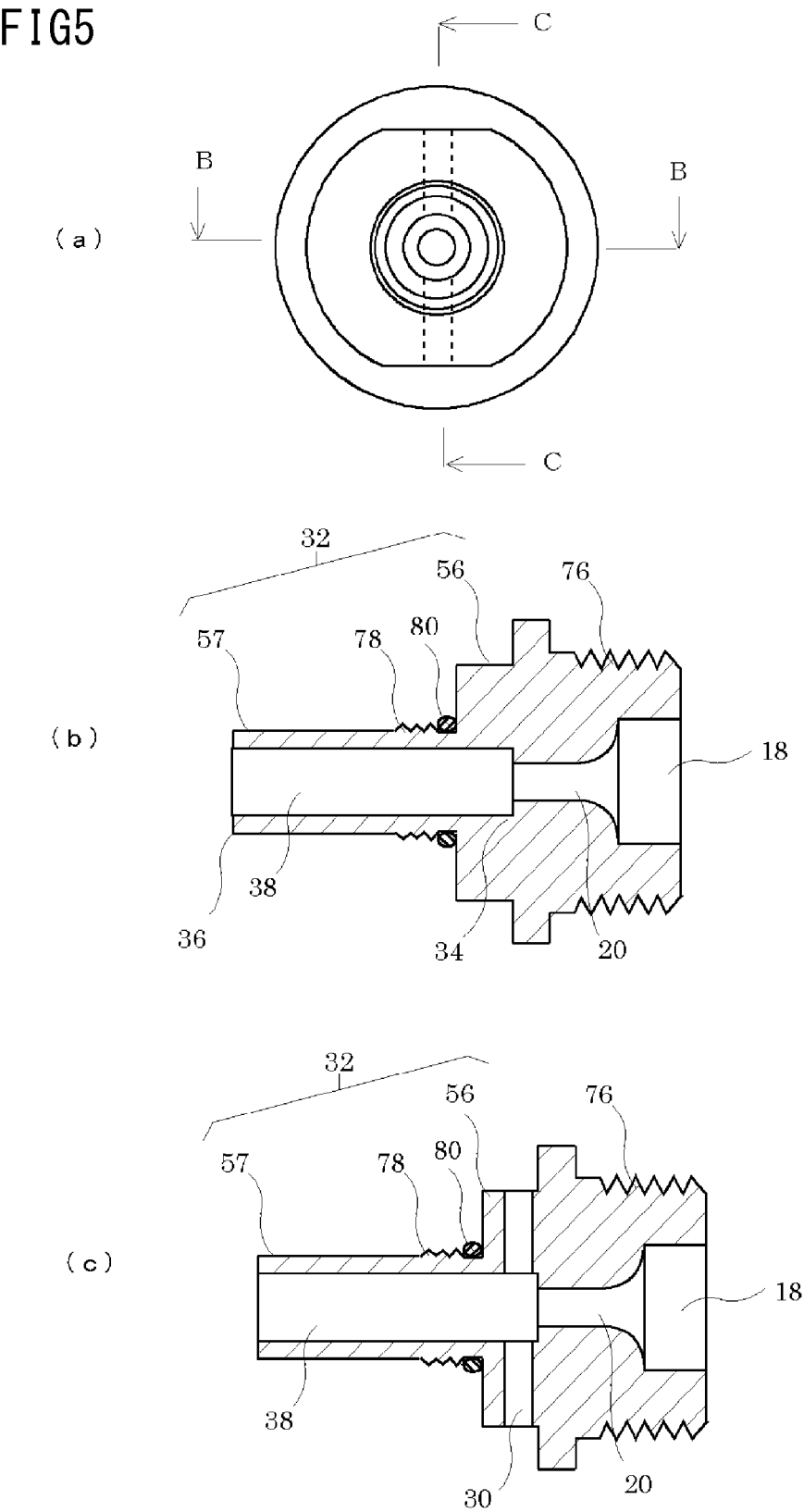
FIG. 5(*a*) is an end view of the upstream side piece, FIG. 5(*b*) is a longitudinal cross-sectional view taken along line B-B and FIG. 5(*c*) is a longitudinal cross-sectional view taken along line C-C.

FIG. 4(a) is a lateral view of the upstream side piece when the water saving valve 10 is formed as two-piece structure and FIG. 4(b) is a lateral view as viewed in the direction of A. FIG. 5(a) is an end view of the upstream side piece, FIG. 5(b) is a longitudinal cross-sectional view taken along line B-B and FIG. 5(c) is a longitudinal cross-sectional view taken along line C-C.

As shown in FIGS. 4(a) and 4(b), the piece is provided with a male screw section 76 on the upstream side outer lateral surface. This part is linked to an upstream side piping or the like. A part including the male screw section 76 forms an upstream side link mechanism part 14. The male screw section 76 is preferably a male screw conforming to a relevant standard. The sleeve 50 shown in FIGS. 6(a) through 6(c) is the other piece.

A conduit part 32 is arranged at the downstream side of the upstream side piece shown in FIGS. 4(a) and 4(c). The conduit part 32 has a large diameter section 56 and a small diameter section 57. The large diameter section 56 is provided with an air suction port 30. The small diameter section 57 is provided on the outer peripheral surface thereof with a male screw section 78. The male screw section 78 is driven into the support body 44 of the sleeve 50 (FIG. 1). As a result, the upstream side piece and the downstream side piece are integrated. The upstream side piece and the downstream side piece can be formed by cutting metal such as iron or hard plastic as respective single structures.

As shown in FIG. 5(b), the water receiving flask part 18 is arranged in an axial section of the male screw section 76. The water receiving flask part 18 receives tap water from the upstream. Tapered hole part 20 is linked at an end thereof to the downstream side of the water receiving flask part 18 and its cross-sectional area is gradually reduced toward the other end thereof. The other end of the tapered hole part 20 is linked to one end 34 of conduit part 32. The conduit part 32 has a large diameter section 56 having a large diameter at the side of the one end 34. The conduit part 32 has a small diameter section 57 having a small diameter at the side of the other end 36 thereof.

A flow path 38 is arranged at an axial section of the conduit part 32 and has a substantially uniform cross-sectional area all the way form the one end to the other end. The large diameter section 56 is provided with the air suction port 30 running through from the flow path 38 of the axial section to the outer peripheral surface thereof. The water receiving flask part 18, the tapered hole part 20 and the conduit part 32 are arranged in series so as to have a common axis. As tap water flows from the water receiving flask part 18, the flow path is reduced at the tapered hole part 20 so that the flowing speed of water is raised and, as tap water flowing at high speed is jetted out from the narrow tapered hole part 20 into the flow path 38 of the wide conduit part 32, the inside of the flow path 38 of the conduit part 32 is held under negative pressure. Therefore, air is sucked from the air suction port 30 and mixed with water flowing through the flow path 38 of the conduit part 32.

Both water receiving flask part 18 of the upstream piece and the conduit part 32 have a substantially uniform circular cross-section all the way from one end to the other end thereof. The cross-sectional area of the water receiving flask part 18 is greater than that of the tapered hole part 20 at the interface thereof. The cross-sectional area of the conduit part 32 is greater than that of the tapered hole part 20 at the interface thereof. With this arrangement, the upstream side piece having a cross-sectional structure as shown in FIGS. 5(a) through 5(c) can be prepared by way of a process including boring the narrowest hole part of the tapered hole part 20 by means of a narrowest drill, boring the flow path 38 of the water receiving flask part 18 and the tapered hole part 20 by a wide drill on the both sides of the narrowest hole part, and tapering the interface of the water receiving flask part 18 and the tapered hole part 20. Since the process does not involve any complex cutting process, the manufacturing cost can be reduced.

The water accelerated by the tapered hole part 20 can be fiercely jetted out from the conduit part 32 to the downstream side by selecting an appropriate relationship between the cross-sectional area of the flow path of the conduit part 32, the cross-sectional area of the narrowest hole part (the other end of the tapered hole part 20) of the tapered hole part 20 and the cross-sectional area of the air suction port 30. Again, it is only necessary to select drills for the above boring operations and the process can be accurately optimized. The pressure in the inside of the flow path 38 of the conduit part 32 can be effectively reduced by making the cross-sectional area of the flow path of the conduit part 32 greater than the sum of the cross-sectional area at the other end of the tapered hole part 20 and that of the air suction port 30.

Since the air suction port 30 is arranged at the large diameter section 56, the air suction port 30 can be more accurately made perpendicular relative to the flow path 38 of the conduit part if compared with the air suction port 30 arranged at the small diameter section 57. Additionally, a check valve 64 (FIG. 1) can be contained in the inside of the air suction port 30. An O-ring 80 is fitted onto the outer periphery of the interface of the small diameter section 57 and the large diameter section 56. The O-ring 80 prevents water from leaking from the interface of the sleeve 50 (FIG. 1) and the large diameter section 56.

FIG. 6(a) is a lateral view of the sleeve, FIG. 6(b) is an end view and FIG. 6(c) is a longitudinal cross-sectional view.

As shown in these drawings, a support body 44 for rigidly securing part of the axial hole to the conduit part 32 (FIG. 5) is arranged in the axial hole of the sleeve 50. More specifically, the conduit part 32 is provided with a male screw section 57 and the support body 44 is provided on the inner surface thereof with a female screw section 82. As the male screw section 78 is driven into the female screw section 82, the sleeve 50 is integrated with the conduit part 32. The eaves-like section 46 is a cylindrical part surrounding the outer peripheral surface of the large diameter section 56 (FIG. 5) of the conduit part 32 where the air suction port 30 is provided. The eaves-like section 46 is not held in tight contact with the outer peripheral surface of the large diameter section 56. The eaves-like section 46 surrounds the outer peripheral surface of the large diameter section 56 with a gap for introducing air from the outside interposed between them. Either the upstream side link mechanism part 14 (FIG. 4) is made a male screw structure and the downstream side link mechanism part 54 is a female screw structure or the upstream side link mechanism part 14 is made a female screw structure and the downstream side link mechanism part 54 is made a male screw structure may be selected freely. The water saving valve 10 can be inserted into a connection section of a standard water pipe 12 with ease by making both the upstream side and the downstream side screw structures.

FIG. 7(a) is a lateral view of the water saving valve of Example 1 and FIG. 7(b) is a cross-sectional view thereof taken along line E-E. FIG. 8(a) is a downstream side end view of the water saving valve of Example 1 and FIG. 8(b) is an upstream side end view of the water saving valve. FIG. 9(a) is a lateral view of the water saving valve of Example 1 as viewed from another direction and FIG. 9(b) is a longitudinal cross-sectional view taken along line F-F.

Note that FIG. 7(b) is a cross-sectional view taken along a plane passing through a pair of air suction ports 30 arranged axially symmetrically relative to the flow path 38 of the conduit part. On the other hand, FIG. 9(b) is a cross-sectional view taken along a plane that does not pass through the air suction port 30.

As shown in FIG. 4(a) through FIG. 9(b), the upstream side link mechanism part 14, the water receiving flask part 18, the tapered hole part 20 and the conduit part 32 are integrally formed while the sleeve 50 and the downstream side link mechanism part 54 are integrally formed in Example 1. The sleeve 50 is rigidly secured to the conduit part 32 by the male screw section 78 (FIGS. 5(a) through 5(c)) formed on the outer peripheral surface of the small diameter section 57 of the conduit part 32 and the female screw section 84 (FIGS. 6(a) through 6(c)) formed at part of the axial hole of the sleeve 50.

Additionally, by making the entire water saving valve a two-piece structure as in this example, the eaves-like section 46 for protecting the air suction port 30 can be made separate from the large diameter section 56. Then, the eaves-like section 46 does not constitute any obstacle when forming the air suction port 30 by processing the large diameter section 56 with use of a drill or the like. Additionally, the outer peripheral surface of the large diameter section 56 that is provided with the air suction port 30 can be surrounded with the gap 48 that is minimal and satisfies the requirement of introducing air from the outside. Thus, it is possible to provide a structure that prevents foreign objects from entering and allows air to flow freely.

Example 2

Figure 10:
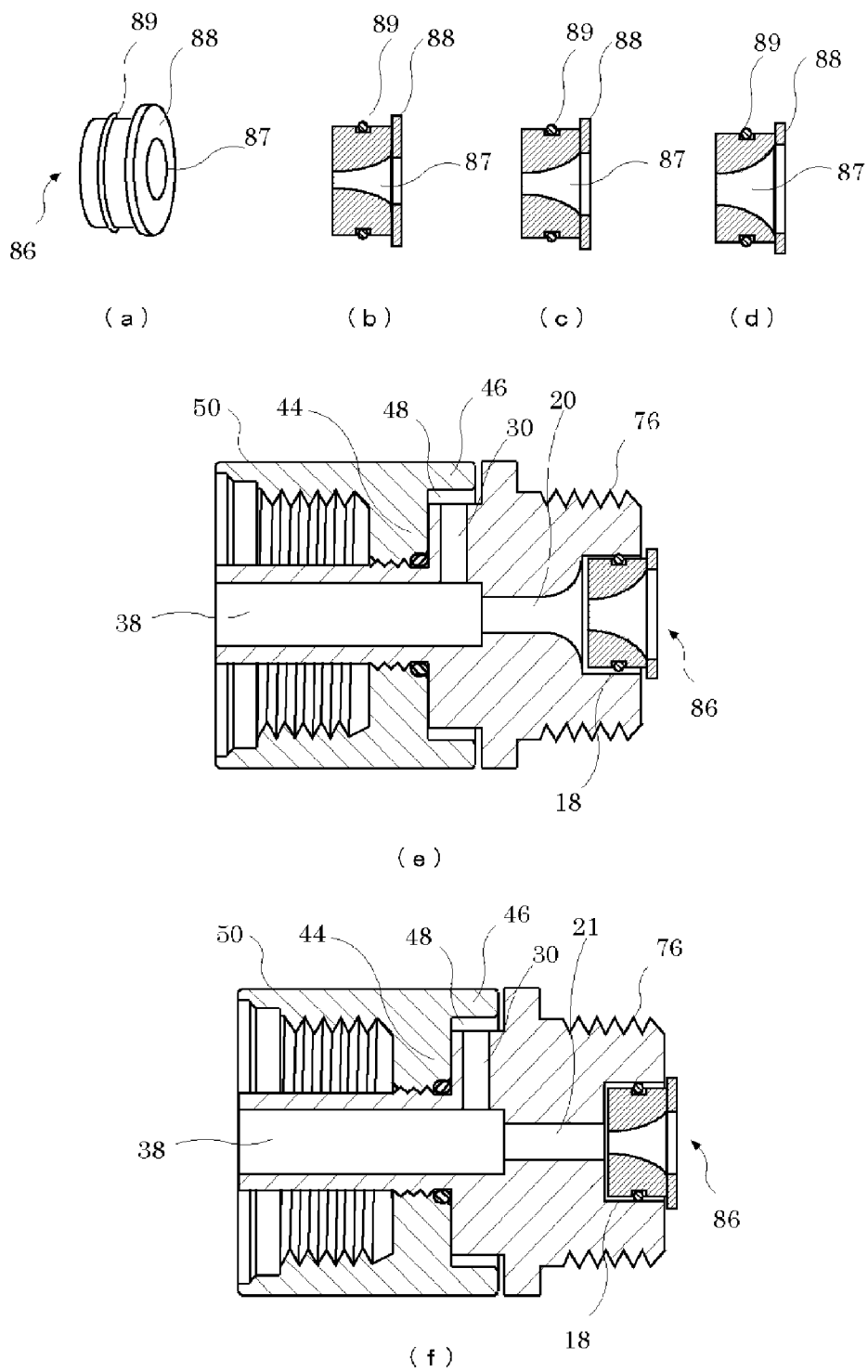

FIGS. 10(a) through 10(f) illustrate a water saving valve of Example 2, of which FIG. 10(a) is a perspective view of tapered hole unit 86 thereof and FIGS. 10(b) through 10(d) are longitudinal cross-sectional views of different variations of tapered hole unit 86, while FIG. 10(e) is a longitudinal cross-sectional view showing how the tapered hole unit 86 is fitted to the water saving valve of Example 1 and FIG. 10(f) is a longitudinal cross-sectional view showing how the tapered hole unit 86 is fitted to a water saving valve obtained by modifying part of the water saving valve of Example 1. Note that only a single air suction port 30 is provided in the illustrated instance. However, a necessary number of air suction ports 30 can be provided.

In this example, the tapered hole part 20 (FIG. 1) of the water saving valve of Example 1 is provided as a unit structure that is separated from the other parts. The tapered hole unit 86 is removably fitted into the water receiving flask part 18 of the water saving valve. As shown in FIGS. 10(a) and 10(b), the tapered hole unit 86 is formed by arranging a flange 88 at an end of a cylindrical main body that is provided at an axial part thereof with a tapered hole 87. The tapered hole 87 is formed with the cross-sectional area of its flow path that is gradually reduced from the upstream side to the downstream side. A rubber ring 89 is fitted to the outer periphery of the tapered hole unit 86.

As shown in FIGS. 10(b) through 10(d), several kinds of tapered hole units 86 whose opening areas at the upstream side are differentiated are prepared in advance so as to include large ones and small ones. Assume that tap water is supplied by way of water pipes under constant hydraulic pressure. Then, tap water can be fed to the downstream side at a low flow rate when a tapered hole unit 86 having a small opening area is arranged in the flow path of the tap water. On the other hand, tap water can be fed to the downstream side at a high flow rate when a tapered hole unit 86 having a large opening area is arranged in the flow path of the tap water. Water may preferably be fed at a relatively low flow rate for a shower when washing hair. Water may preferably be fed at a relatively high flow rate for a shower when washing a body. Thus, a tapered hole unit 86 that is suited for the purpose of the use can be selected. Water saving valves can suitably be manufactured on a mass production basis when they are made to have a same structure except the tapered hole unit 86.

A tapered hole unit 86 is fitted to a water saving valve same as that of Example 1 in the instance of FIG. 10(e). The flow rate of water can be selected by using one of the tapered hole units 86 of FIGS. 10(b) through 10(d). In the instance of FIG. 10(f), a through hole 21 whose flow path has a cross-sectional area that is constant from the upstream to the downstream is employed for the tapered hole part 20 arranged between the water receiving flask part 18 and the flow path 38 of the conduit part. As the tapered hole unit 86 is fitted in position, tap water can be fed into the flow path 38 of the conduit part at a raised flowing speed to reduce the internal pressure of the flow path 38 of the conduit part. Then, air is sucked into the inside of the flow path 38 of the conduit part by way of the air suction port 30 so that air is mixed with water and fed to the downstream side.

When the tapered hole unit 86 is fitted to the water receiving flask part 18, the rubber ring 89 is pinched between the inner wall of the water receiving flask part 18 and the outer wall of the tapered hole unit 86 to exert resilient force to both of them. As a result, the tapered hole unit 86 is fitted into the water receiving flask part 18 and would not easily come out. On the other hand, when the tapered hole unit 86 that is fitted into the water receiving flask part 18 has to be taken out, the user grasp the flange 88 and pulls it out by hand. The rubber ring 89 and the flange 88 are provided for such fitting and removing operations.

Of the water saving valve of Example 2 illustrated in FIG. 10(f), the upstream side link mechanism part 14, the water receiving flask part 18 and the conduit part 32 are integrally formed, while the sleeve 50 and the downstream side link mechanism part 54 are integrally formed. Additionally, the water receiving flask part 18 and the conduit part 32 are linked to each other by way of a through hole 21 having a cross-sectional area smaller than the conduit part 32. All the remaining parts are same as those of Example 1 and the sleeve 50 is rigidly secured to the conduit part 32 by means of a male screw formed on the outer peripheral surface of the large diameter section or the small diameter section of the conduit part 32 and the female screw formed at part of the axial hole of the sleeve 50. A rubber ring 89 is employed to rigidly secure the tapered hole unit 86 to the water receiving flask part 18. However, the tapered hole unit 86 may be rigidly secured to the water receiving flask part 18 alternatively by screwing the former into the latter.

Example 3

Figure 11:
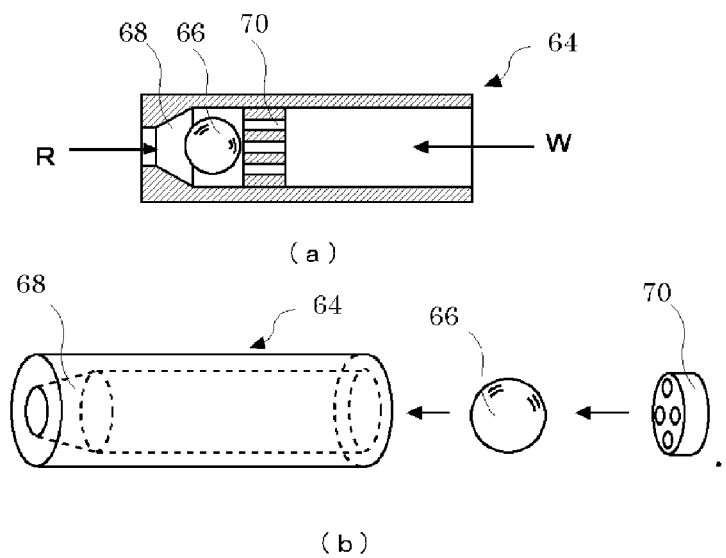
FIGS. 11(a) and 11(b) show a check valve to be fitted into a water saving valve of Example 3.

FIGS. 11(a) and 11(b) show a check valve to be fitted into a water saving valve of Example 3. FIG. 11(a) is a longitudinal cross-sectional view of the check valve and FIG. 11(b) is an exploded perspective view of the check valve.

The check valve 64 is inserted into the inside of the air suction port 30 of the water saving valve (FIG. 1). The check valve 64 is a cylindrical body having at an end thereof a tapered hole 68. The check valve 64 contains a ball 66 and a stopper 70 is fitted into the check valve. The tapered hole 68 has at an end an inner diameter greater than the diameter of the ball 66 and at the other end an inner diameter smaller than the diameter of the tapered hole 68. Therefore, as the ball 66 is pressed against the inner surface of the tapered hole 68, the ball 66 blocks the check valve 64 at the side of the tapered hole 68. The stopper 70 is a plate that has a large number of through holes through which air and water can pass and is adapted to prevent the ball 66 from coming out.

The check valve 64 having the above-described configuration allows air to be sucked from the air suction port 30 toward the conduit part 32 of the water saving valve (FIG. 1) but checks tap water flowing out from the conduit part 32 toward the air suction port 30. In other words, when air flows in along the direction of arrow R, the check valve 64 cannot prevent air from flowing. On the other hand, when the exit of water is closed at the downstream side of the water saving valve to stop the flow of tap water, the hydraulic pressure in the inside of the conduit part 32 rises and water tries to flow out from the conduit part 32 toward the air suction port 30. As hydraulic pressure is applied in the direction of arrow W, the ball 66 is pressed against the tapered hole 68 to block the flow of water. Thus, water never bursts out from the air suction port 30. Therefore, a shower head 86 or a tap having a water blocking function at the downstream side can be fitted by providing the check valve 64 in the air suction port 30.

Example 4

Figure 12:
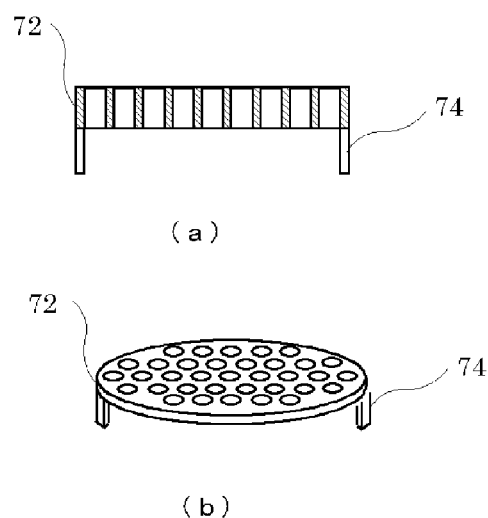
FIGS. 12(a) and 12(b) show a filter to be fitted into a water saving valve of Example 4.

FIGS. 12(a) and 12(b) show a filter to be fitted into a water saving valve of Example 4. FIG. 12(a) is a longitudinal cross-sectional view of the filter and FIG. 12(b) is a perspective view of the filter.

An instance of containing a filter 72 in the water receiving flask part 18 of the water saving valve (FIG. 1) will be described for this example. The filter 72 has a function of trapping foreign object(s) getting into tap water.

Generally, a net-like filter is pinched in a connecting part of piping. However, in the case of the water saving valve 10 according to the present invention, a filter is contained in the water receiving flask part 18. As a result, the water saving valve 10 itself is made to have a filtering function. The filter 72 is supported by legs 74 and can be removably fitted into the water receiving flask part 18 so that it can be served with ease. Additionally, as a result, any foreign object can be prevented from entering into the air suction port 30 or the like.

Example 5

Figure 13:
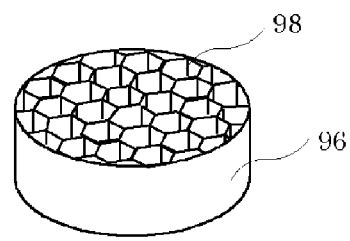
FIG. 13 is a perspective view of a flow rectifying cylinder to be fitted into a water saving valve of Example 5.

FIG. 13 is a perspective view of a flow rectifying cylinder to be fitted into a water saving valve of Example 5.

The flow rectifying cylinder 96 is arranged at the downstream side of the conduit. The position indicated by a chain line in FIG. 1 is suitable. Only the sleeve 50 is extended in the downstream direction and the flow rectifying cylinder 96 may preferably be supported by and rigidly secured to the inner surface of the sleeve 50. The flow rectifying cylinder 96 is formed by arranging a large number of through holes 98 in parallel with the direction of flowing water. A complex turbulence of water is formed in a part where tap water is discharged from the conduit to the downstream side having a large cross-sectional area. The turbulence of water by turn produces noises and vibrations. The flow rectifying cylinder 96 has a function of rectifying the direction of flowing water and does not transmit noises and vibrations to the downstream side.

Example 6

FIGS. 14(a) and 14(b) are longitudinal cross-sectional views of a principal part of a water saving valve of Example 6 that includes a check valve and illustrate its operation.

Referring to FIGS. 14(a) and 14(b), the check valve 64 of this example is cylindrical and can move freely in the inside of the air suction port 30. The check valve 64 may be manufactured by using metal or plastic. The check valve includes a cylindrical section 92 and a bulged section 94. The area of the gap 88 formed between the cylindrical section 92 and the inner wall of the air suction port 30 is sufficiently smaller if compared with the area of the axial hole 90. The bulged section 94 is arranged at the outer periphery of an end of the cylindrical section 92 and positioned between the eaves section 46 of the sleeve 50 and the surface of the large diameter section 56 of the conduit part 32. It has a function of limiting any move of the cylindrical section 92 from the air suction port 30 to the conduit part 32.

As shown in FIG. 14(a), when air is sucked in along the direction of arrow R from the air suction port 30 toward the conduit, the cylindrical section 92 entirely gets into the air suction port 30 as it is pushed by the air flow. As a result, an end of the axial hole 90 of the cylindrical section 92 is opened to the side of the gap 48. Thus, the cylindrical section 94 cannot prevent air from being sucked in. On the other hand, when tap water tries to flow out from the conduit part 32 toward the air suction port 30, an end of the axial hole 90 of the cylindrical section 92 is pressed against the eaves-like section 46. As a result, the axial hole 90 of the cylindrical section 92 is closed to prevent tap water from flowing out from the air suction port 30 through the axial hole 90 of the cylindrical section 92.

Figure 15:
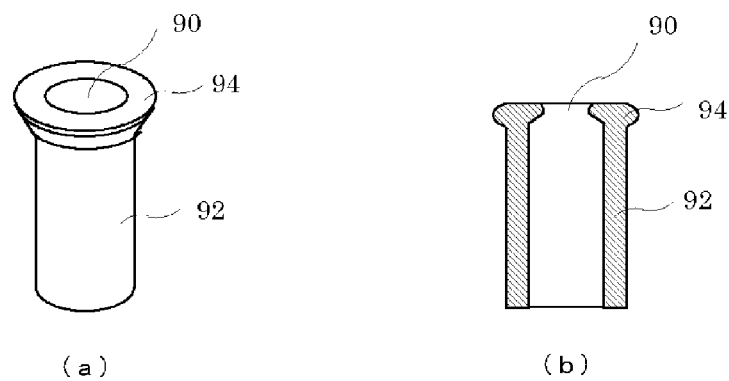
FIG. 15(a) is a perspective view of an example of check valve that can be employed for the example of FIGS. 14(a) and 14(b) and FIG. 15(b) is a longitudinal cross-sectional view of an example of check valve obtained by modifying the shape of the bulged section.

FIG. 15(a) is a perspective view of an example of check valve that can be employed for the example of FIGS. 14(a) and 14(b) and FIG. 15(b) is a longitudinal cross-sectional view of an example of check valve obtained by modifying the shape of the bulged section.

As shown in FIG. 15(b), the cylindrical section 92 may preferably be so processed that the outer diameter of an end of the cylinder becomes slightly greater than the remaining part thereof and the inner diameter thereof becomes slightly smaller than the remaining part thereof. For example, it can be processed with ease in the above-described manner to form a cylindrical section 92 as shown in FIG. 15(b) by using a thermoplastic material, heating an end of the cylinder to become soft and exerting external force. The check valve is preferably manufactured by using elastic silicon resin or the like in order to make it function well. The operation of such a check valve will be described below by referring to FIGS. 16(a) through 16(d).

Figure 16:
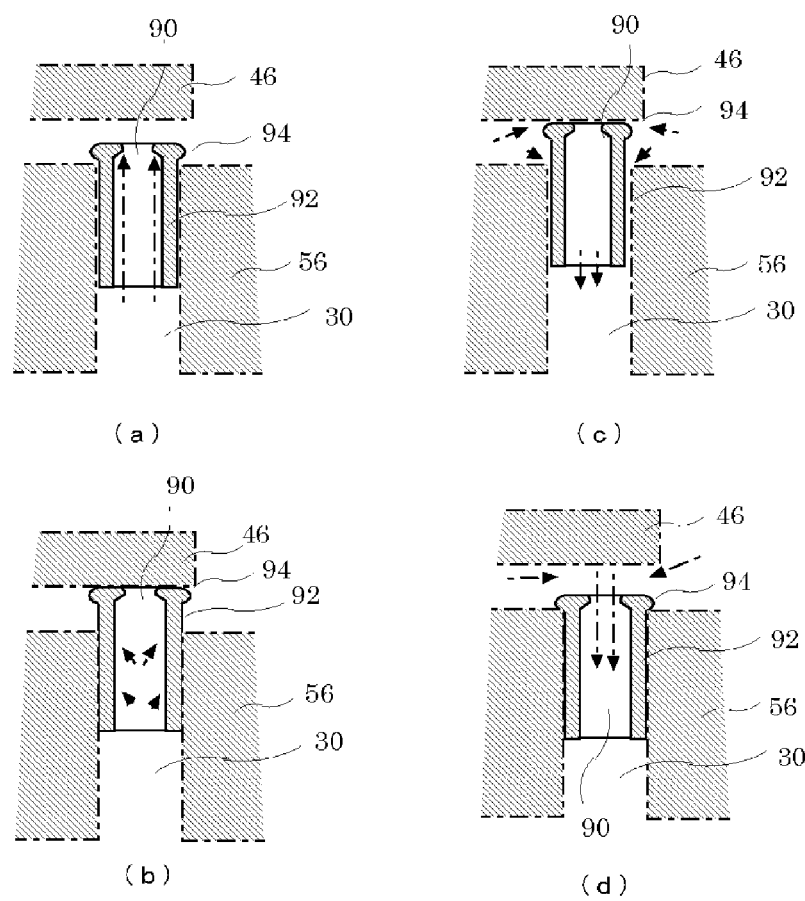
FIGS. 16(a) through 16(d) are longitudinal cross-sectional view of a main part of a water saving valve, illustrating the operation of the check valve thereof.

FIGS. 16(a) through 16(d) are longitudinal cross-sectional view of a main part of a water saving valve, illustrating the operation of the check valve thereof. As described above by referring to FIG. 14(a), the cylindrical section 92 entirely gets into the inside of the air suction port 30 as shown in FIG. 16(a) when air is sucked into from the air suction port 30 and the both ends of the axial hole 90 are opened. Then, as a water flow indicated by a chain line in FIG. 16(a) arises at the air suction port 30, the cylindrical section 92 is pushed to move by the water flow. Thus, as shown in FIG. 16(b), it is brought into a state where the bulged section 94 is pressed against the eaves-like section 46. If the inner diameter of the axial hole 90 is made slightly smaller at the eaves-like section 46 side, strong force is exerted to press the cylindrical section 92 against the eaves-like section 46.

When the bulged section 94 is partly formed by using an soft and elastic plastic material, the bulged section 94 is partly deformed and airtightly brought into contact with the eaves-like section 46. On the other hand, when the cylindrical section 92 is partly formed by using a soft and elastic plastic material, the cylindrical section 92 partly swells under hydraulic pressure and is pressed against the inner wall of the air suction port 30. Thus, the cylindrical section 92 and the bulged section 94 substantially completely block the air suction port 30 to prevent water from flowing out as shown in FIG. 16(b).

On the other hand, when the pressure in the inside of the air suction port 30 is reduced, the cylindrical section 92 shrinks under the atmospheric pressure to produce a large gap between the air suction port 30 and the cylindrical section 92 as shown in FIG. 16(c). As a result, the cylindrical section 92 is drawn into the inside of the air suction port 30 to restore the state illustrated in FIG. 16(d). With the above-described arrangement, air is allowed to be sucked in from the air suction port 30 and tap water is prevented from flowing out through the air suction port 30. Additionally, the check valves of examples shown in FIGS. 14(a) and 14(b) and FIG. 16(a) through 16(d) are structurally simple and hence optimum as parts to be fitted into the air suction port 30 whose dimensions are several millimeters. Furthermore, such check valves provide advantages of low cost and easy servicing.

INDUSTRIAL APPLICABILITY

A water saving valve according to the present invention is developed for the purpose of saving water that is supplied by way of piping from an artificially built facility. The water saving valve mixes air with tap water to an appropriate extent and, at the same time, increases the speed of water flow. As a result, the water saving valve can reduce the quantity of consumed water without significantly altering the feeling when tap water is discharged from a tap, shower head or some other water discharging nozzle to hit the hands or the skin of the user. The water saving effect by turn reduces the charge for consumed tap water in various fields of human activities including hotels, public baths, swimming pools and sports clubs and also reduces emission of global warming gas. Therefore, the water saving valve according to the present invention can broadly find applications in various fields where water is required to be consumed minimally to wash objects when necessary.

REFERENCE SIGNS LIST

10: water saving valve
11: upstream end
12: water pipe
13: downstream end
14: upstream side link mechanism part
15: piping
16: shower head
17: tap
18: water receiving flask part
20: tapered hole part
21: through hole
30: air suction port
32: conduit part
34: one end of conduit part
36: other end of conduit part
38: flow path of conduit part
44: support body
46: eaves-like section
48: gap
50: sleeve
54: downstream side link mechanism part
56: large diameter section
57: small diameter section
64: check valve
66: ball
68: tapered hole
70: stopper
72: filter
74: leg
76: male screw section
78: male screw section
80: O-ring
82: female screw section
84: female screw section
86: tapered hole unit
87: tapered hole
88: flange
89: rubber ring
90: axial hole
92: cylindrical section
93: gap
94: bulged section
96: flow rectifying cylinder
98: through hole

The invention claimed is:

1. A water saving valve comprising:
an upstream side link mechanism part for linking the valve to a water pipe;
a water receiving flask part for receiving tap water from the water pipe;
a tapered hole part linked at an end thereof to the downstream side of the water receiving flask part with the cross-sectional area of its flow path gradually decreasing toward the other end thereof;
a conduit part linked at one end thereof to the other end of the tapered hole part and having a large diameter section of a large outer diameter at the one end side, a small diameter section of a small outer diameter at the other end side and a flow path running along an axial part thereof from the one end to the other end with a uniform cross-sectional area, the large diameter section having an air suction port running through from the axial part to the outer peripheral surface;
a sleeve having a support body part rigidly securing part of an axial hole to the conduit part and an eaves-like section surrounding the outer peripheral surface of the large diameter section having the air suction port with a gap for introducing air from the outside; and
a downstream side link mechanism part for linking the sleeve to a downstream side piping.

2. The water saving valve according to claim 1, wherein the water receiving flask part, the tapered hole part and the conduit part are connected in series so as to show a common axis and each of the water receiving flask part and the conduit part has a substantially uniform circular cross-section all the way from an end to the other end thereof, whereas the water receiving flask part has a greater cross-sectional area at the interface of the water receiving flask part and the tapered hole part and the conduit part has a greater cross-sectional area at the interface of the conduit part and the tapered hole part.

3. The water saving valve according to claim 1, wherein
the upstream side link mechanism part, the water receiving flask part, the tapered hole part and the conduit part are integrally formed while the sleeve and the downstream side link mechanism part are integrally formed; and
the sleeve is rigidly secured to the conduit part by means of a male screw formed on the outer peripheral surface of the large diameter section or the small diameter section of the conduit part and a female screw formed at part of the axial hole of the sleeve.

4. The water saving valve according to claim 1, wherein
the upstream side link mechanism part, the water receiving flask part and the conduit part are integrally formed and the sleeve and the downstream side link mechanism part are integrally formed;
the tapered hole part is structurally separated so as to be removably fitted into the water receiving flask part;
the water receiving flask part and the conduit part are linked to each other by way of a through hole having a cross-sectional area smaller than the conduit part; and
the sleeve is rigidly secured to the conduit part by means of a male screw formed on the outer peripheral surface of the large diameter section or the small diameter section of the conduit part and a female screw formed at part of the axial hole of the sleeve.

5. The water saving valve according to claim 1, wherein
the cross-sectional area of the flow path of the conduit part is made to be greater than the sum of the cross-sectional area of the flow path of the other end of the tapered hole part and the cross-sectional area of the air suction port.

6. The water saving valve according to claim 1, wherein
a check valve that allows air to be sucked from the air suction port toward the conduit but prevents tap water from flowing out from the conduit part toward the air suction port is contained in the inside of the air suction port.

7. The water saving valve according to claim 6, wherein
the check valve has a cylindrical section that can freely move in the inside of the air suction port, the area of the gap formed between itself and the inner wall of the air suction port being sufficiently small if compared with the area of the axial hole, and a bulged section arranged at the outer periphery of an end section of the cylindrical section and located between the eaves of the sleeve and the outer surface of the conduit part to limit any move of the cylindrical section from the air suction port to the conduit part; and the check valve releases the axial hole end of the cylindrical section between the eaves of the sleeve and the outer surface of the conduit part to press the axial hole end of the cylindrical section against the eaves and prevent tap water from flowing out from the air suction port through the axial hole of the cylindrical section under the pressure of tap water flowing out from the conduit part toward the air suction port when air is sucked in from the air suction port toward the conduit.

8. The water saving valve according to claim 1, wherein
the water receiving flask part contains a filter for trapping any foreign object(s) getting into tap water.

9. The water saving valve according to claim 1, wherein
a flow rectifying cylinder having a large number of through holes extending in parallel with the direction of water flow is provided at the downstream side of the conduit.

10. The water saving valve according to claim 1, wherein
either the upstream side link mechanism part is made to be a male screw structure and the downstream side link mechanism part is made to be a female structure or the upstream side link mechanism part is made to be a female screw structure and the downstream side link mechanism part is made to be a male screw structure.

\* \* \* \* \*